Figure 1:
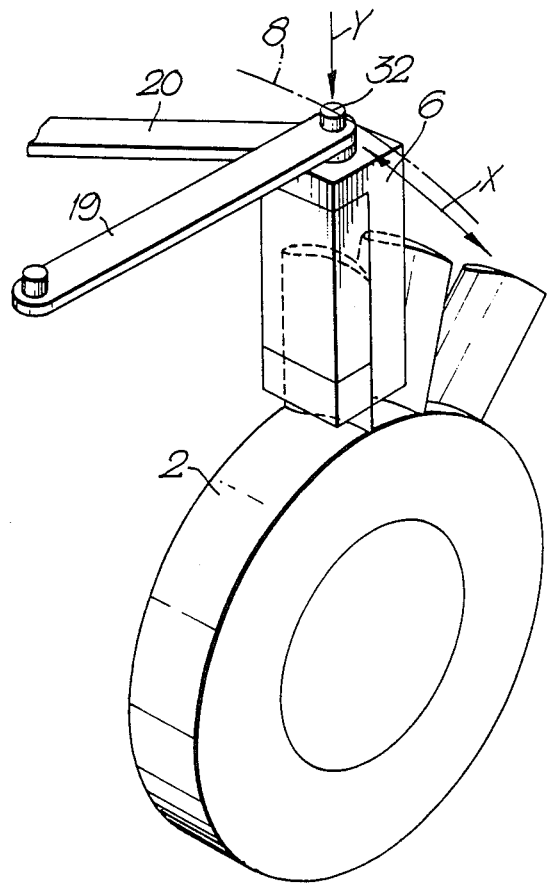

United States Patent [19]

Goddard

[11] Patent Number: 4,884,736

[45] Date of Patent: Dec. 5, 1989

[54] OSCILLATING MECHANISM

[75] Inventor: John Goddard, Bristol, England

[73] Assignee: Rolls Royce plc, London, England

[21] Appl. No.: 307,055

[22] Filed: Feb. 7, 1989

Related U.S. Application Data

[63] Continuation-in-part of Ser. No. 174,899, Mar. 29, 1988, abandoned.

[30] Foreign Application Priority Data

Apr. 16, 1987 [GB] United Kingdom ................. 8709286

[51] Int. Cl.⁴ .............................................. B23K 20/12
[52] U.S. Cl. ............................................ 228/2; 74/43
[58] Field of Search ................................ 228/2; 74/43

[56]  References Cited

U.S. PATENT DOCUMENTS 3,777,967 12/1973 Searle et al. ............................ 228/2

FOREIGN PATENT DOCUMENTS

| 199391 | 8/1958 | Austria | .................... | 74/43 |
| 596469 | 5/1934 | Fed. Rep. of Germany . | | |
| 1169749 | 5/1964 | Fed. Rep. of Germany | .......... | 74/43 |
| 58988 | 12/1969 | Poland | .................... | 74/43 |

Primary Examiner—Kenneth J. Ramsey
Attorney, Agent, or Firm—Oliff & Berridge

[57] ABSTRACT

A mechanism suitable for friction welding aerofoil blades to the periphery of a disc. The mechanism comprises a first member (flywheel 12) which has an ecentric crank pin. Two pivotally interconnected links 18 and 20 are connected between the crank pin and a second member 19 which is pivotally mounted. A blade to be friction welded (by rubbing it in an arcuate path on the disc) is mounted at the point of pivotal connection 32 between the second link 20 and the member 19. An actuator lever 24 is pivotally mounted on a pivot 22 which is located in the vicinity of the locus of movement of the pivotal interconnection 30 between the two links 18, 20. The actuator has a third link 28 which is of the same length as the link 20. The third link is connected by a pivot 26 to the lever 24 at a radius equal to the length of the second and third links 20 and 28. Movement of the lever 24 about its pivot 22 when the pivots 30 and 22 coincide, to bring the pivot 26 into line with the pivot 32 freezes the oscillation of the pivot 32 to enable the blade to be welded to the disc at a precise location along the arcuate path.

6 Claims, 4 Drawing Sheets

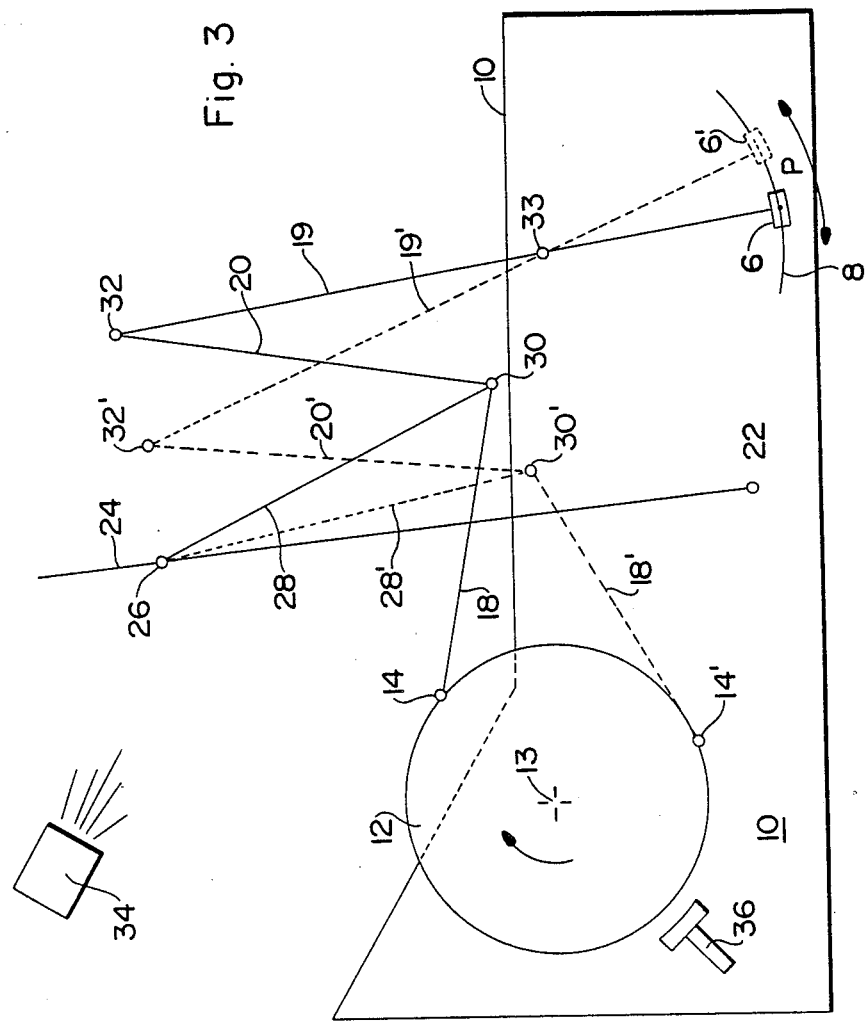

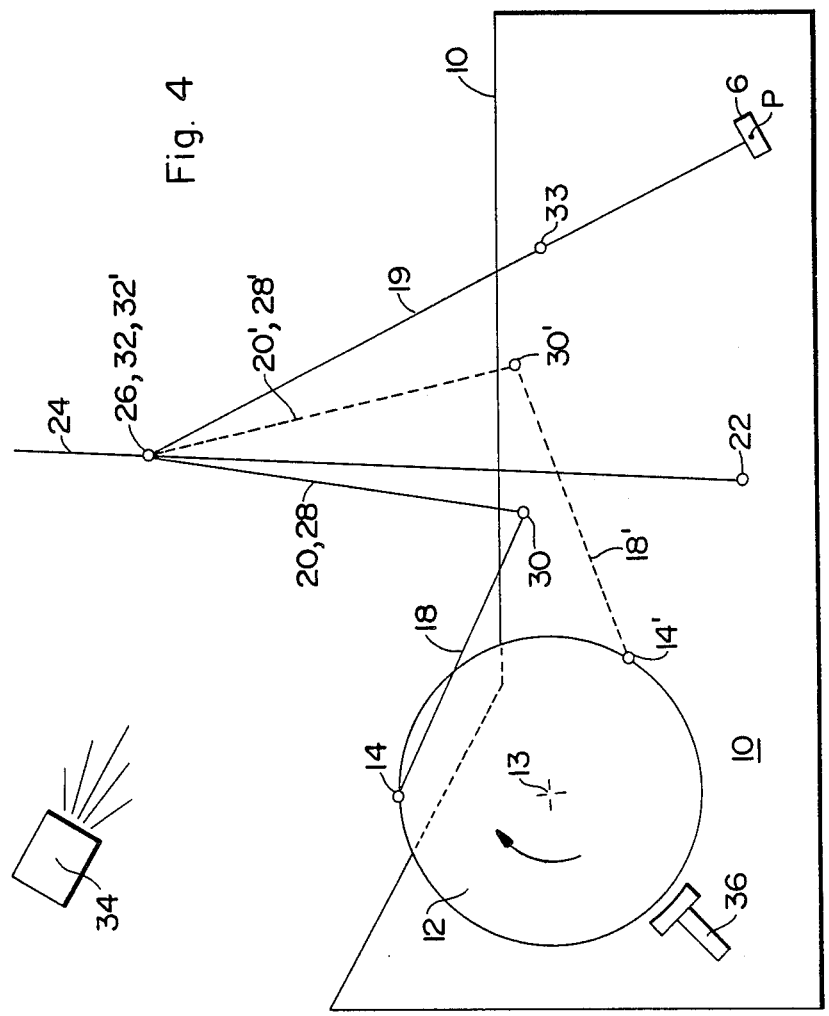

OSCILLATING MECHANISM

This is a contiuation-in-part of application Ser. No. 07/174,899 filed Mar. 29, 1988 and now abandoned.

This invention relates to a mechanism for oscillating an object along an arcuate path and for stopping the object precisely at a predetermined point along the arcuate path.

In gas turbine engines there is a need to weld preformed aerofoil shaped blades to the periphery of a disc to produce what is known as a blisk. One method of welding such blades to the periphery of the disc is friction welding. In friction welding, the inner end of the aerofoil blade is held in contact with the periphery of the disc and oscillated in the axial direction to heat the inner end of the aerofoil and a localised region of the periphery of the disc until they become plastic. As soon as they become plastic the oscillation of the blade is stopped and the blade is pushed radially inwards to effect the weld. Although friction welding is a simple and effective method of welding there is a fundamental problem that has eluded many previous attempts to achieve a successful technique.

Basically the problem resides in devising a device for oscillating the blade at say 3000 oscillations per minute with loads (normal and parallel to the surfaces) of about 5 to 15 tons with an amplitude of a few millimeters (e.g. 4 mm), and stopping the oscillation of the blade instantly at exactly the same axial position so that all the blades lie between the same axial planes.

A further complication resides in the fact that it is preferable to oscillate the blade along an arcuate path because the shape of the inner end of the aerofoil blade is predominantly curved.

An object of this invention is to provide a mechanism which is capable of oscillating a blade along an arcuate path and stopping it precisely along the path.

The invention as claimed enables the oscillation of the object to be stopped precisely by moving the actuator lever to bring the pivot between the third link and the actuator lever in line with the pivot between the second link and the second member.

Figure 2:
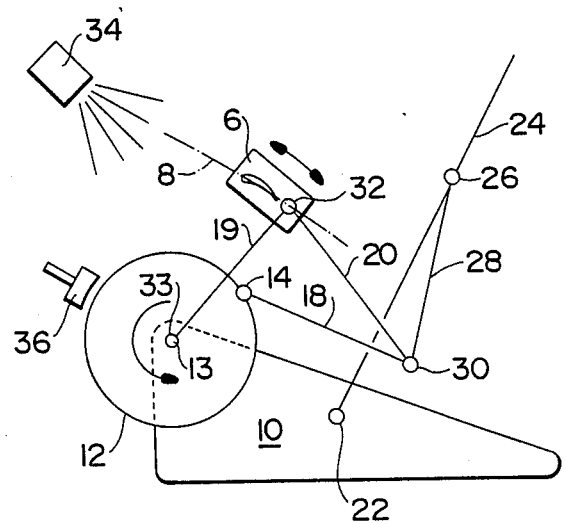

Two embodiments of the present invention will now be described, by way of examples with reference to the accompanying drawings, in which:

FIG. 1 illustrates schematically a method of friction welding blades to a disc, and FIGS. 2, 3 and 4 show two mechanisms constructed in accordance with the present invention.

Referring to FIG. 1, there is shown a metal disc 2 to the periphery of which it is desired to weld a plurality of equispaced aerofoil shaped blades. Each blade is held in contact with the periphery of the disc 2 by means of a clamp 6 operated by the mechanism shown in FIG. 2 or FIGS. 3 and 4.

The blade is oscillated or reciprocated along an arcuate path 8 which is approximately of the same radius as the radius of curvature of the blade to be welded.

The clamp is moved laterally with a force X of between 5 and 15 tons, and simultaneously a force Y of between 5 and 15 tons is applied radially inwards to cause frictional heating. As soon as the surfaces are plastic the blade and the disc are urged radially together a predetermined amount to form an upset and effect the welding.

It is important that all the leading edges of the blades be accurately located in relation to each other so that all the blades lie parallel to each other between common axial planes. The movement of the clamp 6 in this invention is preferably provided by a linkage which translates continuous rotary motion into reciprocating arcuate motion, as will be described with reference to FIGS. 2 to 4.

In FIG. 2 there is shown a planar base member 10 provided with an upstanding axle or first axis 13 on which there is mounted an axially rotatable member or flywheel 12. The fly wheel 12 is provided with an eccentrically mounted crank pin 14 on which is pivotably mounted a first link 18. The base 10 is also provided with a second link 19 pivotally mounted on a first pivot 33 which is axially coincident with axle 13. Link 19 is approximately the same length as the radius of curvature of the blade to be welded. A second pivot 30 is provided at that end of link 18 remote from the crank pin 14. One end of a third link 20 is pivotally connected to pivot 30, and a third pivot 32 is provided at the other end of link 20.

A fourth pivot 22 is mounted on base 10. Pivotally connected to pivot 22 is one end of an actuator lever 24. A fifth pivot 26 is mounted on lever 24 near an end remote from pivot 22. One end of a fourth link 28 is pivotally mounted on pivot 26. Link 28 is the same length as link 20. The other end of 1ink 28 is pivotally connected to links 18 and 20 at their pivoted interconnection 30. Pivot 22 is located relative to the length of link 18 and the distance between crank pin 14 and axle 13 so that the locus of pivot 30 passes over lever 24 as flywheel 12 rotates. In another embodiment, not illustrated, the arrangement may be such that the locus of pivot 30 passes over pivot 22 as the flywheel 12 rotates. The blade to be oscillated during the friction welding is mounted in carrier 6 which is mounted on pivot 32 at the end of link 19. It should be observed that in this and other embodiments axis 13 and pivots 22 and 33 are fixed relative to each other on the base 10.

Rotation of the flywheel 12 causes the pivot 32 to be reciprocated along an arcuate path 8 when the actuator lever 24 is in the position shown in FIG. 2. Rotation of lever 24 about pivot 22 is used to freeze the arcuate motion of pivot 32. Movement of actuator lever 24 may be svnchronised with the rotation of flywheel 12 so that the oscillation of pivot 32 can be stopped precisely by decreasing the amplitude of the oscillation without stopping the rotation of flywheel 12. When pivot 26 is co-axially aligned with pivot 32 the pivot 32 stops oscillating at a point along the path of oscillation (i.e. over the same zone of frictional heating). This point is at the intersection of the loci of pivots 26 and 32. Thereafter, pivot 30 follows an arcuate path about pivot 26 whilst pivot 26 remains stationary.

Referring to FIGS. 3 and 4 there is shown a second embodiment of the invention in which identical reference numerals are used for parts corresponding to those in FIG. 2. In particular, FIGS. 3 and 4 shown the configuration of the linkages (solid lines and chain lines) for two respective positions of the crankpin during the rotation of the flywheel 12, those parts (i.e. linkages and pivots) in the second position being indicated by primed numerals.

The embodiment of FIGS. 3 and 4 is distinguished from that of FIG. 2 in that pivot 33 is no longer coincident with the axis 13 of the flywheel 12 but is located on a remote part of the base 10. Furthermore, pivot 33 is located between the ends of link 19 instead of at an end. As a consequence, blade carrier 6 is located at the opposite end of link 19 to pivot 32, at a distance from pivot 33 equal to the radius of curvature of the blade to be welded.

As with the embodiment of FIG. 2, rotation of flywheel 12 causes reciprocal motion of carrier 6 along arcuate path 8; likewise, rotation of lever 24 about pivot 22 brings pivot 26 into axial alignment with pivot 32 and freezes the motion of carrier 6. This is the position shown in FIG. 4 where it will be seen that continued rotation of flywheel 12 causes pivot 30 to reciprocate along an arcuate path but leaves carrier 6 immobile.

The position P of carrier 6 along the total arc of its movement is proportional to the ratio of the length of link 18 to the length of link 20, and would, for example, be midway along arc 8 for links 18, 20 equal in length.

The location of pivot 33 relative to the axis of rotation 13 of flywheel 12 is not critical. Pivot 33 could, for example, be located so that at a mid-point in the travel of the mechanism link 20 is substantially at right angles to link 19.

It is preferred to strobe, or time, the movement of the lever 24 relative to the rotational speed of the flywheel 12 so as to initiate movement of lever 24 and to bring pivot 26 into axial alignment with pivot 32 the instant that pivot 30 coincides with lever 24 or pivot 22, as the case may be. A strobe device 34 is indicated in the drawings.

If desired, braking may be applied to flywheel 12 when moving lever 24, thereby decreasing the frequency of oscillation of pivot 32 whilst at the same time decreasing the amplitude of the oscillation. A braking device 36 is indicated in the drawings. In this manner the frequency of oscillation may be accurately controlled.

I claim:

1. A mechanism for oscillating an object along a path and for stopping the object at a predetermined point along the path, the mechanism comprising:
   (a) an axially rotatable member mounted for rotation about an axis;
   (b) a crank pin mounted eccentrically on the axially rotatable member with respect to said axis;
   (c) a first link pivotably mounted at one end to the crank pin;
   (d) a first pivot means fixed in relation to said axis;
   (e) a second link mounted for pivotal movement about the first pivot means and adapted to carry the object along the arcuate path;
   (f) a second pivot means located at an end of the first link opposed to the crank pin;
   (g) a third pivot means located at an end of the second link distal to the first pivot means;
   (h) a fourth pivot means fixed in relation to said axis and the first pivot means;
   (i) an actuator lever pivotally connected at one end to the fourth pivot means;
   (j) a fifth pivot means located on the actuator lever and distal from the fourth pivot;
   (k) a third link pivotally connected at one end to the second pivot and at the other end to the third pivot;
   (l) a fourth link pivotally mounted at one end to the second pivot means and at the other end to the fifth pivot means, the fourth link being of the same length as the third link;

the actuator lever being rotatable about the fourth pivot means during the rotation of the axially rotatable member about its axis to a position where the locus of the fifth pivot means about the fourth pivot means intersects the locus of the third pivot means as the second link pivots about the first pivot means, thereby to stop the oscillation of the object along the arcuate path, characterised in that the locus of the second pivot means during the rotation of the axially rotatable member intersects the actuator lever and there is provided a timing means to time the movement of the actuator lever so as to cause the fifth pivot means to be aligned with the third pivot means when the second pivot means is coincident with the actuator lever.

2. A mechanism as claimed in claim 1 wherein the locus of the second pivot means intersects the axis of the fourth pivot means.

3. A mechanism as claimed in claim 1 wherein the timing means is a strobe.

4. A mechanism as claimed in claim 1 wherein there is further provided a means of braking the rotation of the axially rotatable member during the rotation of the actuator lever to said position.

5. A mechanism as claimed in claim 1 wherein the first pivot means is axially coincident with the axis of the axially rotatable member.

6. A friction welding apparatus incorporating the mechanism as claimed in claim 1 wherein the object is a component to be welded to another component.

* * * * *